United States Patent
Borror et al.

(10) Patent No.: US 6,966,722 B1
(45) Date of Patent: Nov. 22, 2005

(54) ADAPTOR FOR REDUCING AND LOCATING BOLT HOLE IN A LARGER OPENING

(75) Inventors: Nelson E. Borror, Chanute, KS (US); Joseph W. Works, Humboldt, KS (US)

(73) Assignee: B&W Custom Truck Beds, Inc., Humboldt, KS (US)

( * ) Notice: Subject to any disclaimer, the term of this patent is extended or adjusted under 35 U.S.C. 154(b) by 0 days.

(21) Appl. No.: 10/440,007

(22) Filed: May 16, 2003

(51) Int. Cl.[7] ................................................ F16B 9/00
(52) U.S. Cl. ............................ 403/3; 403/4; 403/243; 403/351; 403/352
(58) Field of Search ................................ 403/3, 4, 243, 403/351, 352; 16/2.1–2.5; 411/398, 539; 280/86.753

(56) References Cited

U.S. PATENT DOCUMENTS

| | | | |
|---|---|---|---|
| 1,097,185 A | | 5/1914 | Oehrle |
| 2,177,148 A | | 10/1939 | Newhall |
| 3,006,443 A | | 10/1961 | Siler |
| 3,041,913 A | * | 7/1962 | Liska ........................... 411/539 |
| 3,329,468 A | | 7/1967 | Beith |
| 3,749,450 A | | 7/1973 | Senter et al. |
| 3,779,610 A | | 12/1973 | Pansky et al. |
| 3,988,038 A | | 10/1976 | Hedlund |
| 4,106,876 A | * | 8/1978 | Tregoning ...................... 403/4 |
| 4,424,984 A | * | 1/1984 | Shiratori et al. ........ 280/86.753 |
| 4,530,512 A | * | 7/1985 | Evlanov ...................... 403/191 |
| 4,539,764 A | | 9/1985 | Pradier |
| 5,387,047 A | | 2/1995 | Korpi |
| 5,632,567 A | | 5/1997 | Lowe et al. |
| 5,779,260 A | | 7/1998 | Reilly et al. |
| 5,927,665 A | | 7/1999 | Grabnic |
| 6,027,071 A | | 2/2000 | Lair |
| 2002/0130548 A1 | | 9/2002 | Gilley et al. |

* cited by examiner

Primary Examiner—Daniel P. Stodola
Assistant Examiner—Victor MacArthur
(74) Attorney, Agent, or Firm—Erickson & Kleypas L.L.C.

(57) ABSTRACT

An adaptor for reducing the size of an original hole in a frame member to an adaptor hole sized to receive a selected bolt and which permits adjustment of the relative location of the adaptor hole relative to the original hole and the frame member. The adaptor comprises a washer plate having first and second projections extending outward from opposite sides of the washer. The adaptor hole extends through the washer plate and the first and second projections. The location of the adaptor hole relative to the first projection is different from the location of adaptor hole relative to the second projection.

2 Claims, 3 Drawing Sheets

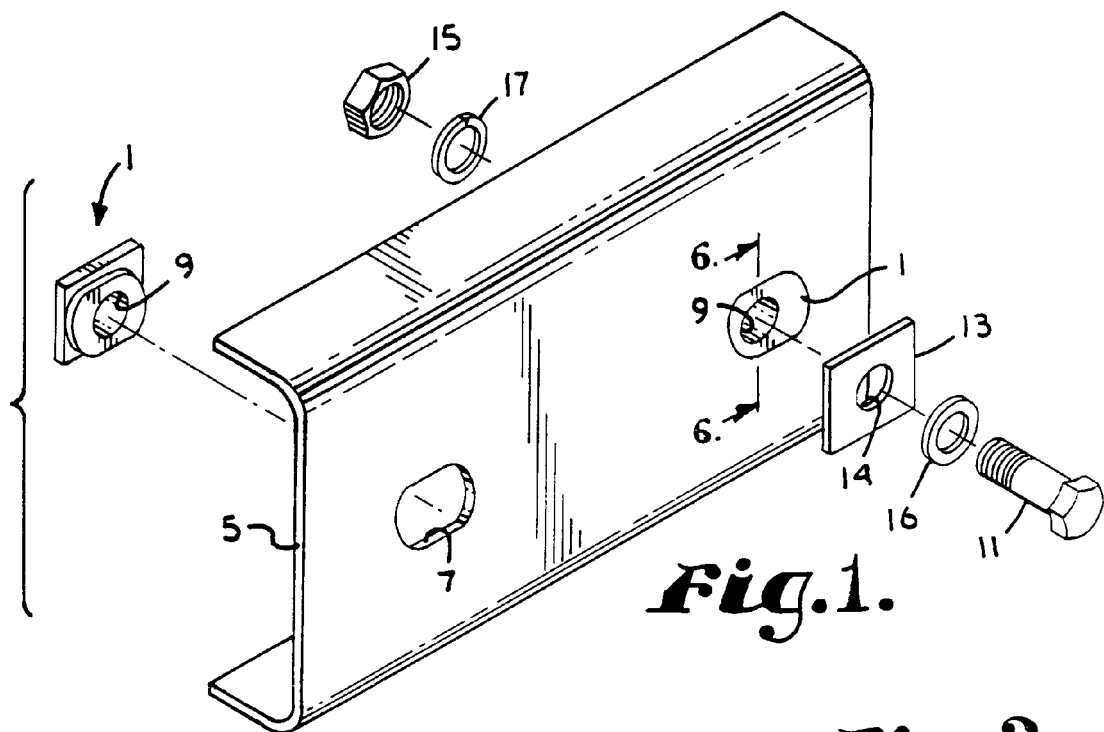
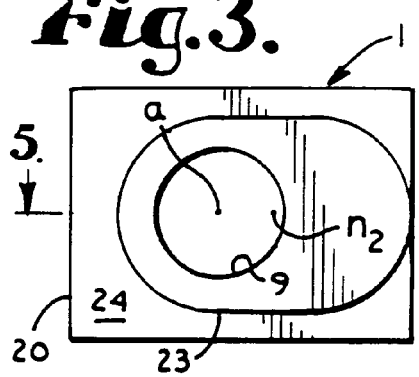
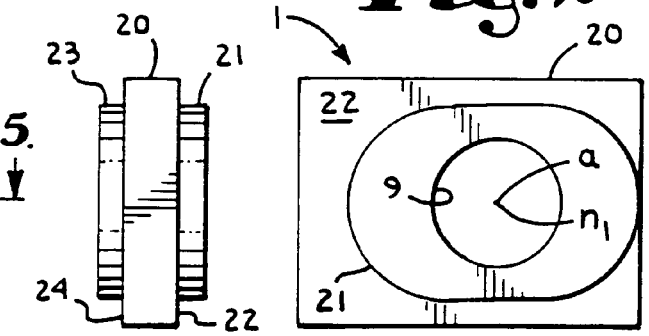
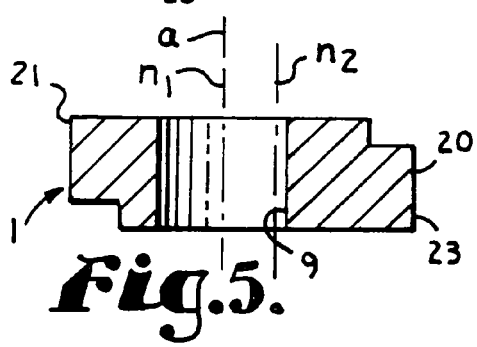
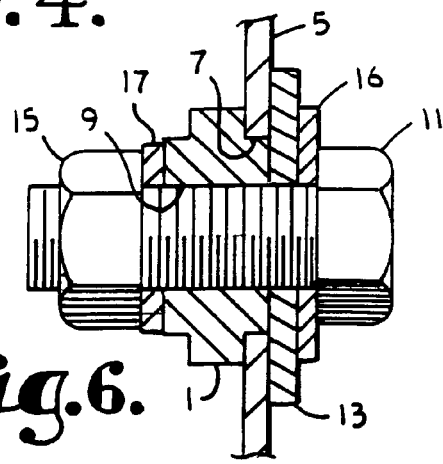

ADAPTOR FOR REDUCING AND LOCATING BOLT HOLE IN A LARGER OPENING

BACKGROUND OF THE INVENTION

The present invention relates to adaptors for reducing and locating a bolt hole in a larger hole in a frame member or the like.

Frame members for articles of manufacture are often provided with pre-formed or pre-drilled holes, through which bolts may be inserted for securing additional items or articles of manufacture to the frame member. For example, it is known to secure a portion of a fifth-wheel hitch to the frame of a pick-up truck. The holes provided in the frames typically are oversized relative to the bolt to be used in securing an item to the frame member to allow the position of the bolt to be adjusted depending on the spacing requirements of the article to be attached to the frame. Such holes may be formed in a wide variety of shapes including ovate or elongated with rounded ends, square, triangular or circular.

Although such enlarged holes or slots provide greater flexibility in bolting items to a frame without having to bore new holes, it is very difficult to be able to tighten a nut associated with the bolt to a degree sufficient to prevent the bolt from sliding relative to the hole or slot upon application of sufficient force or upon the gradual loosening of the nut.

There remains a need for an adaptor which can be used to reduce the size of a hole in a frame member and which also provides flexibility as to where the bolt hole will be located relative to the original hole and the frame member.

SUMMARY OF THE INVENTION

The present invention comprises an adaptor for reducing the size of an original hole in a frame member to a bolt hole or adaptor hole sized to receive a selected bolt and which permits adjustment of the relative location of the bolt hole relative to the original hole and the frame member. The adaptor comprises a washer plate having a first projection extending outward from a first side of the washer plate and a second projection extending outward from a second side of the washer plate. The first and second projections are sized to snugly fit within the original hole in the frame member. An adaptor hole extends through the washer plate and the first and second projections. The location of the adaptor hole relative to the first projection is different from the location of the adaptor hole relative to the second projection.

In one embodiment, the adaptor hole is centered relative to the first projection or relative to a normal axis extending through the first projection. The second projection is formed or positioned on the washer plate relative to the adaptor hole, such that the axis of the circular adaptor hole is offset from the normal axis of the second projection.

As used herein, and with reference to FIG. 7 of the drawings, the normal axis is intended to refer to an axis extending perpendicular to the plane defined by a face of the projection or a face of the washer plate. The normal axis for the projection shown in FIG. 7 is labeled n. The axis extending through the adaptor hole and parallel to the normal axis of the projection is labeled a in FIG. 7. The term horizontal or longitudinal axis generally is intended to refer to an axis extending horizontally or longitudinally through a projection as oriented in FIG. 7 and is labeled x. The term vertical axis generally is intended to refer to an axis extending vertically through a projection as oriented in FIG. 7 and is labeled y.

When the original hole in the frame and the first and second projections are ovate or elongated, insertion of the first projection (with the adaptor hole centered relative to the projection) into the original hole centers the adaptor hole relative to the original hole. Inserting the second projection into the original hole permits the circular adaptor hole to be positioned in one of two orientations relative to the center of the original hole depending on the orientation of the second projection in the hole. The adaptor thereby permits orientation of the adaptor hole in three different locations relative to the original hole; centered relative to the original hole or offset in one of two opposite directions relative to the center of the original hole.

In an alternative embodiment, the axis of the adaptor hole is offset from the normal axis of the first projection by a first distance, and the axis of the adaptor hole is offset from the normal axis of the second projection by a second distance. Depending on the orientation of the first projection relative to the original hole, inserting the first projection into the original hole permits the adaptor hole to be positioned in one of two positions on opposite sides of the center of the original hole and spaced from the center of the original hole by the first distance. Insertion of the second projection into the original hole permits the circular adaptor hole to be positioned in one of two positions on opposite sides of the center of the original hole and spaced from the center of the original hole by the second distance, which is different from the first distance. The alternative embodiment of the adaptor thereby permits orientation of the adaptor hole in four different locations relative to the original hole.

Further embodiments are contemplated for use with original holes in frame members of different geometries, including round, triangular, square, pentagonal or other shapes. Each adaptor has first and second projections extending outward from opposite sides of a washer plate and having geometries corresponding to the geometries of the original hole with which it is adapted for use. An adaptor hole is formed through the first and second projections and the washer plate with the relative position of the adaptor hole to the normal axis of the associated first and second projections being different.

The adaptor hole is preferably cylindrical or round in cross-section but may also be prismatic or square in cross-section to cooperate with a carriage type bolt. It is foreseen that the geometry of the adaptor hole may be of other geometries as well.

The depth or height of the first and second projections is selected to correspond to the thickness of the frame member having the original hole into which the projections are to be inserted. The adaptors are intended for use in bolting another article of manufacture to the frame member such that the article will not slide relative to the original, over-sized hole. It is foreseen that the adaptor hole may be straight walled or threaded.

The adaptor may be formed from a wide variety of materials including metal, plastic, fiberglass or composite materials.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary and exploded perspective view of a frame member having elongate slots formed therein and showing a bolt hole adaptor positioned in each of the slots and showing a bolt securing a portion of an article of manufacture to the frame member using one of the adaptors.

FIG. 2 is a front elevational view of one of the adaptors shown in FIG. 1.

FIG. 3 is a rear elevational view of the adaptor sown in FIG. 2.

FIG. 4 is a left side end view of the adaptor shown in FIG. 2.

FIG. 5 is a cross-sectional view taken generally along line 5—5 of FIG. 3.

FIG. 6 is an enlarged and fragmentary view taken along line 6—6 of FIG. 1.

DETAILED DESCRIPTION OF THE INVENTION

Figure 7:
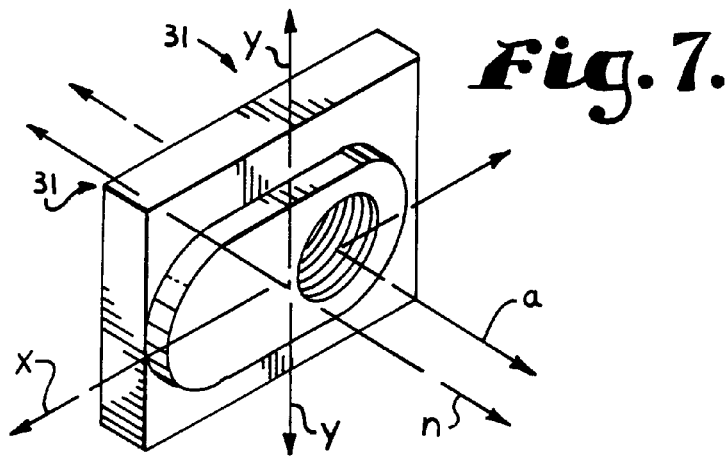
FIG. 7 is a perspective view of a first alternative embodiment of the adaptor having a threaded circular adaptor hole.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, FIG. 1 is a fragmentary, exploded view showing a first embodiment of a pair of bolt hole adaptors 1, used with a frame member 5 to convert an elongated slot or original hole 7 in the frame member 5 into a circular adaptor hole 9 of reduced size for receiving a selected bolt 11. The bolt 11 is used to secure another structure or article of manufacture 13 to the frame member 5, by inserting the bolt 11 through an hole 14 in the article of manufacture 13 aligned with the circular adaptor hole 9 in the frame member 5. Nut 15 and washers 16 and 17 are then used to secure the article of manufacture 13 to frame member 5.

Referring to FIGS. 2–6, the adaptor 1 is preferably cast or machined from a single piece of material, but it is foreseen that it could be formed from separate layers or pieces. The adaptor 1 includes a washer plate 20, a first projection 21 extending outward from a first face or side 22 of the washer plate 20 and a second projection 23 extending outward from a second face or side 24 of the washer plate 20. The circular adaptor hole 9 extends through the first and second projections 21 and 23 and the washer plate 20.

The first and second projections 21 and 23 are shaped to conform to the shape of the original hole or elongated slot 7 in the frame member 5 and are sized to fit snugly in the elongated slot 7 when inserted therein. The first and second projections 21 and 23 are smaller in overall area than the washer plate 20 such that portions of the washer plate 20 extend radially outward from the projections 21 and 23. The height or depth of the first and second projections 21 and 23 is preferably approximately equal to or less than the thickness of the frame member 5 in which the original hole or slot 7 is formed.

The first and second projections 21 and 23 are positioned on the respective opposite faces 22 and 24 of the washer plate 20 at different orientations relative to the circular adaptor hole 9 extending therethrough. Referring to FIG. 2, the first projection 21 is generally centered relative to or around the circular adaptor hole 9. More specifically, a normal axis n1 of the first projection 21, extending centrally therethrough, is aligned with a central axis a of the circular adaptor hole 9. Referring to FIG. 3, the second projection 23 is offset relative to the circular adaptor hole 9. More specifically, the normal axis n2, extending centrally through the second projection 23, is offset from the central axis a of the circular adaptor hole 9 by a first distance d1.

When the first projection 21 is inserted in slot 7, the adaptor hole 9 is centered relative to the slot 7. When the second projection 23 is inserted into slot 7, the center of adaptor hole 9 extends to a first side of the center of the slot 7 by the first distance d1. By removing the second projection 23 from the slot 7 and rotating the adaptor 1, one hundred and eighty degrees about its normal axis and then reinserting the second projection 23 into slot 7, the center of hole 9 extends to a second side of the center of the slot 7 by the first distance.

Upon selecting the desired orientation of the circular adaptor hole 9 in the slot 7, the selected bolt 11 is inserted through first washer 16, the aligned hole 14 in the article of manufacture 13, and second washer 17. Nut 15 is then threaded onto bolt 11 to secure the assembly in place as shown in FIG. 6. Referring to FIG. 7, there is shown a first alternative embodiment 31 having a threaded circular adaptor hole 33.

Figure 8:
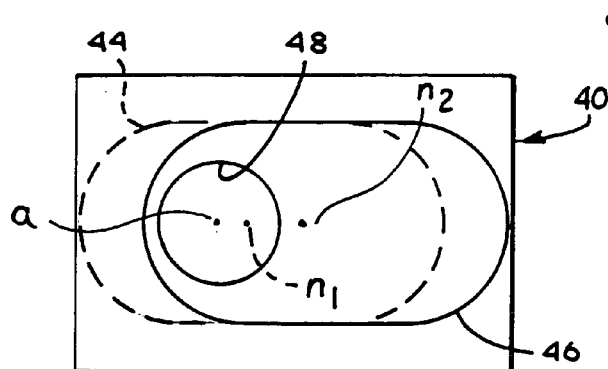
FIG. 8 is a rear plan view of a second alternative embodiment of the adaptor for use with an elongated slot in a frame member.

A second alternative embodiment of the adaptor 40, for use with the elongated slots 7 in frame member 5, is shown in FIG. 8. Adaptor 40 includes a washer plate 42, a first projection 44 (shown in phantom lines), a second projection 46 and a circular adaptor hole 48 extending normally through the first and second projections 44 and 46 and washer plate 42.

The first and second projections 44 and 46 are positioned on opposite faces of the washer plate 42 in different orientations relative to the circular adaptor hole 48. More specifically, the normal axis n1, extending centrally through the first projection 44, is offset from the central axis a of the circular adaptor hole 48 by a first distance d1, and the normal axis n2, extending centrally through the second projection 46, is offset from the central axis a of the circular adaptor hole 48 by a second distance d2. The circular adaptor hole 48 can therefore be positioned in four different orientations relative to a central axis extending through slot 7. In particular, the central axis a of the circular adaptor hole 48 can be offset from the central axis of the slot 7 by the distances d1 and d2 in either a first or second direction or side relative thereto.

Figure 9:
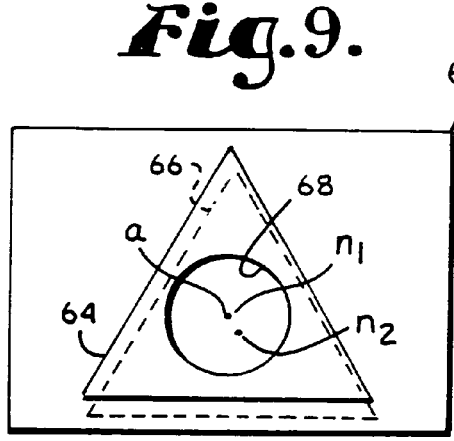
FIG. 9 is a front plan view of a third alternative embodiment of the adaptor for use with an triangular hole in a frame member.

FIG. 9 discloses a third alternative embodiment of the adaptor 60, for use with a triangular shaped hole in a frame member (not shown). Adaptor 60 includes a washer plate 62, a first projection 64, a second projection 66 (shown in phantom lines) and a circular adaptor hole 68 extending through the first and second projections 64 and 66 and washer plate 62. The first and second projections 64 and 66 are shaped to conform to the shape of the original hole or triangular shaped hole in the frame member and are sized to fit snugly in the triangular shaped hole when inserted therein. The projections 64 and 66 are shown as equilateral triangles. However it is foreseen that an adaptor could be provided having a triangular projection with only two sides of equal length.

The first and second projections 64 and 66 are positioned on opposite faces of the washer plate 62 in different orientations relative to the circular adaptor hole 68. More specifically, the normal axis n1, extending centrally through the first projection 64, is aligned with a central axis a of the circular adaptor hole 68 and the normal axis n2, extending centrally through the second projection 66, is offset from the central axis a of the circular adaptor hole 68 by a first distance d1. The circular adaptor hole 68 can therefore be positioned in four different orientations relative to a central axis extending through an equilateral triangle shaped hole in a frame member. In particular, the circular adaptor hole 68 can be centered relative to the triangular shaped hole by inserting the first projection 64 therein, or the central axis a of the circular adaptor hole 68 can be offset from the central axis of the triangular shaped hole by the distance d1 in one of three directions depending on the orientation of the second projection 66 in the equilateral triangle shaped hole. The circular adaptor hole 68 can be positioned in three different orientations relative to a central axis extending through a triangular shaped hole with two equal length sides in a frame member.

Figure 10:
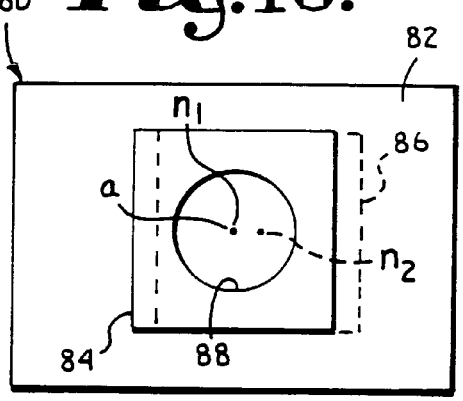
FIG. 10 is a front plan view of a fourth alternative embodiment of the adaptor for use with a square hole in a frame member.

FIG. 10 discloses a fourth alternative embodiment of the adaptor 80, for use with a square shaped hole in a frame member (not shown). Adaptor 80 includes a washer plate 82, a first projection 84, a second projection 86 (shown in phantom lines) and a circular adaptor hole 88 extending through the first and second projections 84 and 86 and washer plate 82. The first and second projections 84 and 86 are shaped to conform to the shape of the original hole or square shaped hole in the frame member and are sized to fit snugly in the square shaped hole when inserted therein.

The first and second projections 84 and 86 are positioned on opposite faces of the washer plate 82 in different orientations relative to the circular adaptor hole 88. More specifically, the normal axis n1, extending centrally through the first projection 84, is aligned with a central axis a of the circular adaptor hole 88 and the normal axis n2, extending centrally through the second projection 86, is offset from the central axis a of the circular adaptor hole 88 by a first distance d1. The circular adaptor hole 88 can therefore be positioned in five different orientations relative to a central axis extending through a square shaped hole in a frame member. In particular, the circular adaptor hole 88 can be centered relative to the square shaped hole by inserting the first projection 84 therein, or the central axis a of the circular adaptor hole 88 can be offset from the central axis of the square shaped hole by the distance d1 in one of four directions depending on the orientation of the second projection 86 in the square shaped hole.

Figure 11:
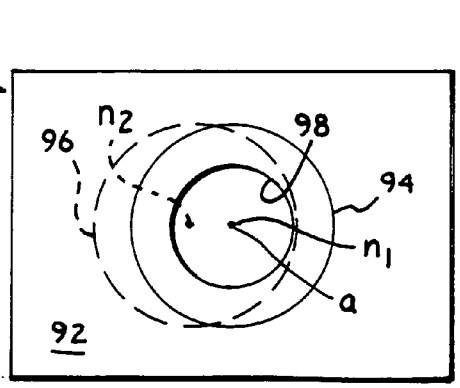
FIG. 11 is a front plan view of a fifth alternative embodiment of the adaptor for use with a round hole in a frame member.

FIG. 11 discloses a fifth alternative embodiment of the adaptor 90, for use with a round hole in a frame member (not shown). Adaptor 90 includes a washer plate 92, a first projection 94, a second projection 96 (shown in phantom lines) and a circular adaptor hole 98 extending perpendicularly through the first and second projections 94 and 96 and washer plate 92. The first and second projections 94 and 96 are shaped to conform to the shape of the original hole or round hole in the frame member and are sized to fit snugly in the round hole when inserted therein.

The first and second projections 94 and 96 are positioned on opposite faces of the washer plate 92 in different orientations relative to the circular adaptor hole 98. More specifically, the normal axis n1, extending centrally through the first projection 94, is aligned with a central axis a of the circular adaptor hole 98 and the normal axis n2, extending centrally through the second projection 96, is offset from the central axis a of the circular adaptor hole 98 by a first distance d1. The circular adaptor hole 98 can be positioned centrally in the hole in the frame member by inserting the first projection 94 therein. By inserting the second projection 96 into the round hole in the frame member and rotating the adaptor 90 therein, the circular adaptor hole 98 can be positioned in any position along an arc spaced the distance d1 from the central axis of the hole in the frame member.

Figure 12:
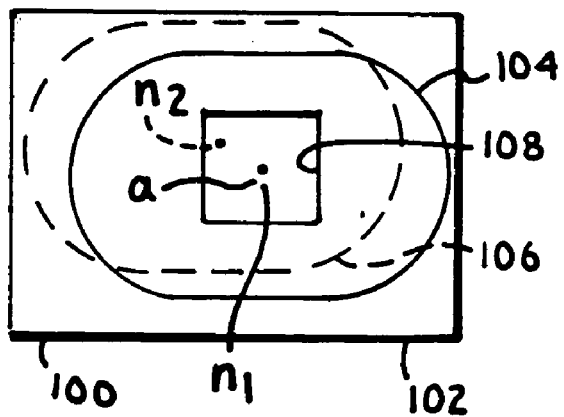
FIG. 12 is a front plan view of a sixth alternative embodiment of the adaptor incorporating a square adaptor hole.

FIG. 12 shows a sixth alternative embodiment of the adaptor 100, for use with an elongate hole or slot, such as slot 7 in frame member 5. Adaptor 100 includes a washer plate 102, a first projection 104, a second projection 106 (shown in phantom lines) and a square adaptor hole 108 extending perpendicularly through the first and second projections 104 and 106 and washer plate 102. The square adaptor hole 108 is adapted for receiving a carriage bolt (not shown). The first and second projections 104 and 106 are shaped to conform to the shape of the original hole or ovate hole or slot 7 in the frame member 5 and are sized to fit snugly in the ovate hole or slot 7 when inserted therein.

The first and second projections 104 and 106 are positioned on opposite faces of the washer plate 102 in different orientations relative to the square adaptor hole 108. More specifically, the normal axis n1, extending centrally through the first projection 104, is aligned with a central axis a of the square adaptor hole 108 and the normal axis n2, extending centrally through the second projection 106, is offset from the central axis a of the square adaptor hole 108 by a first distance d1. As shown in FIG. 12, normal axis n2 of the second projection can be offset from the central axis a of the square hole 108 in both the horizontal and vertical directions or axes (x and y as shown in FIG. 7).

The square adaptor hole 108 can be positioned centrally in the hole in the frame member by inserting the first projection 104 therein. The square hole 108 can be positioned in one of two positions relative to slot 7 in frame member 5 by inserting the second projection 106 into the slot 7 and positioning the projection in one of two orientations. Depending on the orientation of the second projection 106, the central axis a of the square adaptor hole 108 can be offset from the central axis of the slot 7 by the distance d1 in either a first or second direction or side relative thereto.

Figure 13:
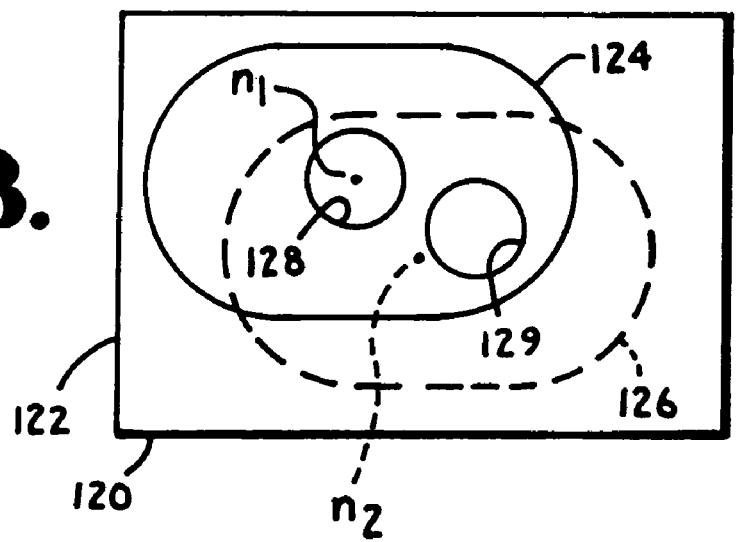
FIG. 13 is a front plan view of a seventh alternative embodiment of the adaptor having a plurality of adaptor holes.

FIG. 13 shows a seventh alternative embodiment of an adaptor 120 for use with an elongate hole or slot, such as slot 7 in frame member 5. Adaptor 120 includes a washer plate 122, a first projection 124, a second projection 126 (shown in phantom lines) and two round adaptor holes 128 and 129, of equal size or diameter, extending perpendicularly through the first and second projections 124 and 126 and washer plate 122. The first and second projections 124 and 126 are shaped to conform to the shape of the original hole or ovate hole or slot 7 in the frame member 5 and are sized to fit snugly in the ovate hole or slot 7 when inserted therein.

The normal axis n1 of the first projection 124 is offset from the normal axis n2 of the second projection 126 to vary the relative position of each of the holes 128 and 129 when the second projection 126 is positioned in the slot 7 in frame member 5. It is foreseen that the adaptor 120 could include more than two holes, such as holes 128 and 129 in a wide variety of spacings and orientations. It is also foreseen that the holes could partially overlap.

It is to be understood that each of the embodiments described above is intended for use generally in the same manner as discussed with respect to the first embodiment of the adaptor 1. It is also to be understood that the shape of the original hole in the frame member and the shape of the corresponding projections, could vary widely and could include round, pentagonal, hexagonal or the like.

It is to be understood that while certain forms of the present invention have been illustrated and described herein, it is not to be limited to the specific forms or arrangement of parts described and shown.

What is claimed is:

1. An adaptor received within an original hole in a frame member, the adaptor comprising: a washer plate having a first projection extending outward from a first face of said washer plate and a second projection extending outward from a second face of said washer plate, said first and second faces of said washer plate extending radially outward past said first and second projections respectively, said washer plate having a dimension larger than the original hole such that the washer plate cannot be received therein, said first and second projections sized and shaped such that they conform to the shape of the original hole, wherein one of the first and second projections is snugly received within the original hole, one of the first and second faces of said washer plate being in flush contact with a first side of the frame member and one of the first and second projections extending into the original hole such that an end face thereof does not extend beyond a second side of the frame member, an adaptor hole extending through said washer plate and said first and second projections; the adaptor hole having a diameter smaller than the original hole and receiving a selected bolt therein; wherein the location of said adaptor hole relative to said first projection is different from the location of said adaptor hole relative to said second projection.

2. The adaptor as in claim 1 wherein a central axis of said adaptor hole is offset a first distance relative to a central, normal axis of said first projection and said central axis of said adaptor hole is offset a second distance relative to a central, normal axis of said second projection, wherein said first distance is different from said second distance and said first and second distances are greater than zero.

\* \* \* \* \*